(12) United States Patent
Hori et al.

(10) Patent No.: US 7,477,963 B2
(45) Date of Patent: Jan. 13, 2009

(54) CARRIAGE SYSTEM

(75) Inventors: Kikuo Hori, Kyoto (JP); Takashi Nakao, Neyagawa (JP); Koichiro Oshiumi, Kyoto (JP); Akihiko Ishiura, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 71 days.

(21) Appl. No.: 11/008,173

(22) Filed: Dec. 10, 2004

(65) Prior Publication Data

US 2005/0171656 A1  Aug. 4, 2005

(30) Foreign Application Priority Data

Jan. 13, 2004 (JP) ............................. 2004-005185

(51) Int. Cl.
*G06F 7/00* (2006.01)
*B65G 37/00* (2006.01)
*B65G 43/00* (2006.01)
*B65G 43/08* (2006.01)
*B65G 47/10* (2006.01)
*B65G 47/46* (2006.01)

(52) U.S. Cl. .................. 700/214; 700/230; 198/358

(58) Field of Classification Search ................ 198/358; 700/215, 228, 213, 214, 225
See application file for complete search history.

(56) References Cited

U.S. PATENT DOCUMENTS

| 3,593,863 | A | | 7/1971 | Kintner |
| 3,799,057 | A | | 3/1974 | Cassel |
| 3,822,766 | A | | 7/1974 | Suter |
| 5,267,173 | A | * | 11/1993 | Tanizawa et al. ............ 700/229 |
| 5,329,449 | A | * | 7/1994 | Tanizawa et al. ............... 701/25 |
| 5,548,521 | A | * | 8/1996 | Krayer et al. ................ 700/214 |
| 6,290,188 | B1 | * | 9/2001 | Bassett ................... 246/182 R |
| 6,370,444 | B1 | * | 4/2002 | Kusunoki .................... 700/214 |
| 6,625,517 | B1 | * | 9/2003 | Bogdanov et al. ........... 700/193 |
| 2004/0000890 | A1 | * | 1/2004 | Genma et al. ................ 318/638 |
| 2005/0011027 | A1 | * | 1/2005 | Heiniger et al. .............. 15/22.1 |

FOREIGN PATENT DOCUMENTS

EP  1 035 044  9/2000

(Continued)

OTHER PUBLICATIONS

Notice of Reason(s) for Refusal Patent Application No. 2004-005185 Dispatched Date Jul. 24, 2006.

(Continued)

*Primary Examiner*—Gene O. Crawford
*Assistant Examiner*—Ramya G Prakasam
(74) *Attorney, Agent, or Firm*—Westerman, Hattori, Daniels & Adrian, LLP.

(57) ABSTRACT

A dog 10 is placed in front of each stop position 8 to notice an overhead running vehicle 20 that ID tag data is to be read. A bar code reader 24 reads the ID tag data to determine the stop position based on a mark reference. The absolute position of an overhead running vehicle 20 with respect to the mark 14 is determined. The overhead running vehicle 20 decelerates and stops at a target position. According to the present invention, the overhead running vehicle 20 can stop without creep running.

3 Claims, 4 Drawing Sheets

FOREIGN PATENT DOCUMENTS

| | | |
|---|---|---|
| EP | 1 345 031 | 9/2003 |
| JP | 60-183405 | 9/1985 |
| JP | 04-123113 A | 4/1992 |
| JP | 5-189036 | 7/1993 |
| JP | 7-2553 | 1/1995 |
| JP | 8-81178 | 3/1996 |
| JP | 2000-29524 | 1/2000 |
| JP | 2001-174206 | 6/2001 |
| JP | 2003-139563 | 5/2003 |
| JP | 2003-156364 | 5/2003 |

OTHER PUBLICATIONS

Office Action dated Feb. 16, 2007 issued in corresponding Japanese Application No. 2004-005185.

* cited by examiner

CARRIAGE SYSTEM

FIELD OF THE INVENTION

The present invention relates to a carriage system such as an overhead running vehicle, a rail guided vehicle, or a stacker crane. In particular, the present invention relates to a reduction in running time achieved by enabling a carriage to be stopped without creep running.

BACKGROUND OF THE INVENTION

The Examined Japanese Utility Model Application Publication (Jikko-Hei) No. 7-2553 discloses running control for a stacker crane for an automatic warehouse in which a mark is provided at each bay of shelves so that the position of the stacker crane is corrected every time the crane passes by the bay. When the coordinates of the position of the stacker crane are called internal coordinates, The Examined Japanese Utility Model Application Publication (Jikko-Hei) No. 7-2553 corrects the internal coordinates every time the bay is passed. Consequently, accurate running control can be performed provided that running wheels do not slip or have varying diameters.

A carriage such as an overhead running vehicle starts creep running (running at very low speed) in front of a stop position so as to stop at the target stop position. For example, when a creep running speed is 0.4 cm/sec and a creep running distance is 2 cm, a running time increases by about 5 seconds.

As an example of a position sensor, the Unexamined Japanese Patent Application Publication (Tokkai-Hei) No. 2001-174206, the Unexamined Japanese Patent Application Publication (Tokkai-Hei) No. 2003-139563 and the Unexamined Japanese Patent Application Publication (Tokkai-Hei) No. 2003-156364 disclose linear sensors that use the magnetic coupling between a magnetic mark such as a magnetic substance or a nonmagnetic substance and a coil. When a plurality of detection coils are connected together in series and an alternate current is conducted through the coils, the voltage of each detection coils varies depending on the positions of the magnetic mark and the detecting coil. When the phase of the position of the detection coil with respect to the magnetic mark is defines as $\theta$ and the angular speed of the alternate current flowing through the detection coil is defined as $\omega$, as signal proportional to $\sin \theta$, $\sin \omega t$, or $\cos \theta$, $\cos \omega t$ is obtained.

SUMMARY OF THE INVENTION

It is an object of the present invention to provide a carriage system that enables a carriage to be stopped at a stop position without creep running.

It is an additional object of the present invention relating to claim 2 to facilitate installation of marks and allow each mark to be accurately read near the stop position.

It is an additional object of the present invention relating to claim 3 to eliminate the need to very accurately install the marks and also eliminate the need to change the mark or data for a running control system of the carriage even when the stop position is changed.

The present invention provides a carriage system wherein a detected mark is provided on a ground in front of and at each stop position, and a carriage is provided with a sensor for detecting the mark and determining a position using the mark as a reference and a running control system which performs speed reduction control using the stop position as a target position in accordance with the mark reference position determined in order to stop the carriage at the stop position. The position determined using the mark as a reference may be called the absolute position based on the mark reference so as to be distinguished from an existing position determined by an encoder.

Preferably, an area in which no mark is provided between the stop positions, and in this area, running of the carriage is controlled in accordance with a position determined by an internal sensor of the running control system.

Preferably, an index is provided on the ground in front of each mark, the index indicating coordinates of the stop position determined using the mark as a reference, and the carriage is provided with means for reading the index. Further, the running control system performs speed reduction control using the stop position coordinates read, as a target position.

According to the present invention, the position of the carriage is determined using the mark provided on the ground in front and at each stop position. Then, a remaining running distance is determined on the basis of the position determined. The carriage is thus stopped at the stop position. This enables the carriage to be stopped without creep running. The running time can be reduced by on the order of several seconds per operation.

According to the aspect of the present invention set forth in claim 2, no mark need to be provided between the stop positions. This facilitates the installation of the marks. Further, the carriage reads the mark near the stop position while running at low speed. This increases the accuracy with which the mark is read.

According to the aspect of the present invention set forth in claim 3, the coordinates of the stop position based on the mark reference are read from the index. The carriage is thus stopped on the basis of the coordinates. This eliminates the need to increase the accuracy with which the marks are installed. The marks may be roughly installed. Further, the stop position may be changed simply by rewriting the index. As a result, the stop position can be easily changed.

DETAILED DESCRIPTION OF THE PREFERRED EMBODIMENTS

The best embodiment for carrying out the present invention will be shown below.

Figure 1:
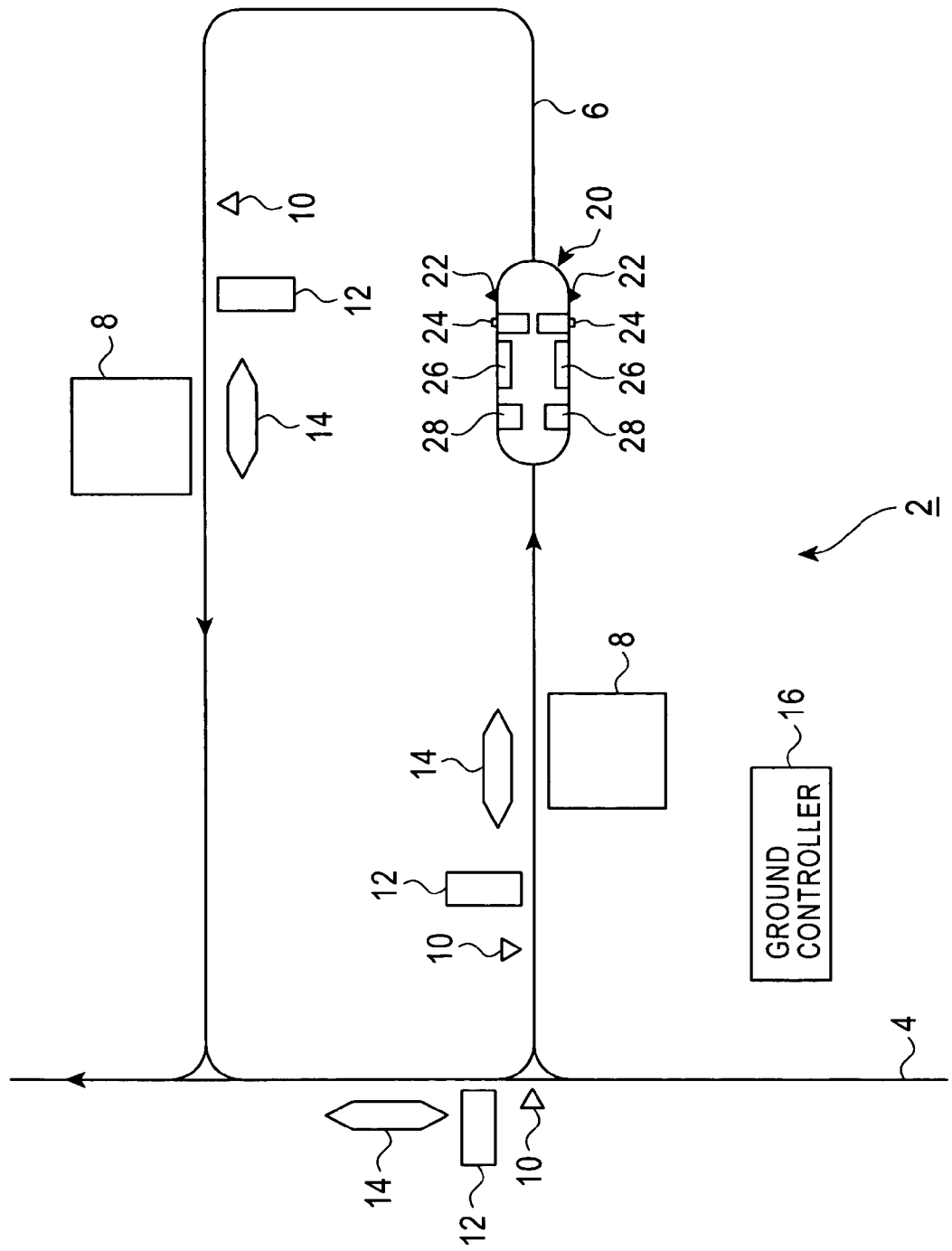
FIG. 1 is a diagram schematically showing the layout of a carriage system according to an embodiment.

FIGS. 1 to 5 show an embodiment and its characteristics. The embodiment will be described in connection with an overhead running vehicle. However, the preset invention is applicable to other carriages. FIG. 1 shows the layout of an overhead running system 2. A running route for an overhead running vehicle includes an inter-bay route 4 and an intra-bay route 6. Stop positions 8 such as stations and load ports for semiconductor processing devices are provided along the routes 4, 6. 10 is, for example, an optical dog. 12 is an ID tag serving as an index. 14 is a mark to be detected. 16 is a ground controller. A running rail for the overhead running vehicle 20 is laid along the routes 4, 6 and along a high place such as a ceiling of a clean room. The overhead running vehicle 20 receives a power supply through the rail and communicates with the ground controller 16 and the like. The dogs 10, the tags 12, and the marks 14 are provided along the running rail.

The overhead running vehicle 20 runs along the routes 4, 6, for example, in only one direction. In the specification, the expression "in front of" is used to refer to an upstream side of a stop position 8. The dog 10, the ID tag 12, and the mark 14 are arranged in front of the stop position 8 in this order. The dog 10 is an optical or magnetic mark noticing the overhead running vehicle 20 that the ID tag 12 is to appear. The ID tag 12 describes the coordinates of the stop position 8 determined using the mark 14 as a reference. The coordinates are used so as to be distinguished from the stop position 8 as a place. The coordinates are synonymous with the position and may have an arbitrary unit.

The ID tag 12 may describe the absolute coordinates of the stop position 8 and the absolute coordinates of the mark 14. However, this inconveniently requires the determination of the absolute coordinates of the stop position 8 and mark 14. Thus, the ID tag 12 preferably describes the coordinates of the stop position 8 determined using the mark 14 as a reference.

Further, the mark 14 is placed in front or at the stop position 8 so as to be readable. The mark 14 need not be provided between stop positions 8, 8. In addition to running control, the overhead running vehicle 20 requires lateral movement, rotative movement, and an elevating and lowering operations (not shown in the drawings) at the stop position 8. The ID tag 12 describes data on these operations for each stop position 8. The data in the ID tag 12 is expressed using a bar code or the like. A technique with which the overhead running vehicle 20 reads the data may be optical or electromagnetic reading.

A dog sensor 22, a bar code reader (BCR) 24, and an absolute position sensor 26 are provided, for example, on both sides of the overhead running vehicle 20. This is to allow the dog 10, the ID tag 12, and the mark 14 to be arranged on either side of the running rail and to allow the overhead running vehicle 20 to be controllably stopped at an arbitrary position including a branching portion. However, the marks and sensor may be provided on only one side of the overhead running vehicle 20. The dog sensor 22 may be an optical sensor such as a photo interrupter or a magnetic sensor depending on the type of the dog 10. The absolute position sensor 26 may be a linear sensor shown in FIG. 3 or an optical sensor shown in FIG. 4. Upon using the dog sensor 22 to detect the dog 10, the overhead running vehicle 20 gets ready to use the bar code reader 24 to read the data from the ID tag 12. The overhead running vehicle 20 then uses the data in the ID tag 12 to determine the coordinates of the stop position 8 with respect to an origin of the mark 14 (a predetermined position in the mark 14). In an area in which the overhead running vehicle 20 can read the mark 14, the overhead running vehicle 20 perform full-closed feedback control using the position read from the mark 14 and the coordinates of the stop position 8 determined using the mark 14 as a reference. The overhead running vehicle 20 thus stops at the stop position 8 without creep running. Further, the overhead running vehicle 20 is provided with a communication section 28 to communicate with the ground controller 16.

Figure 2:
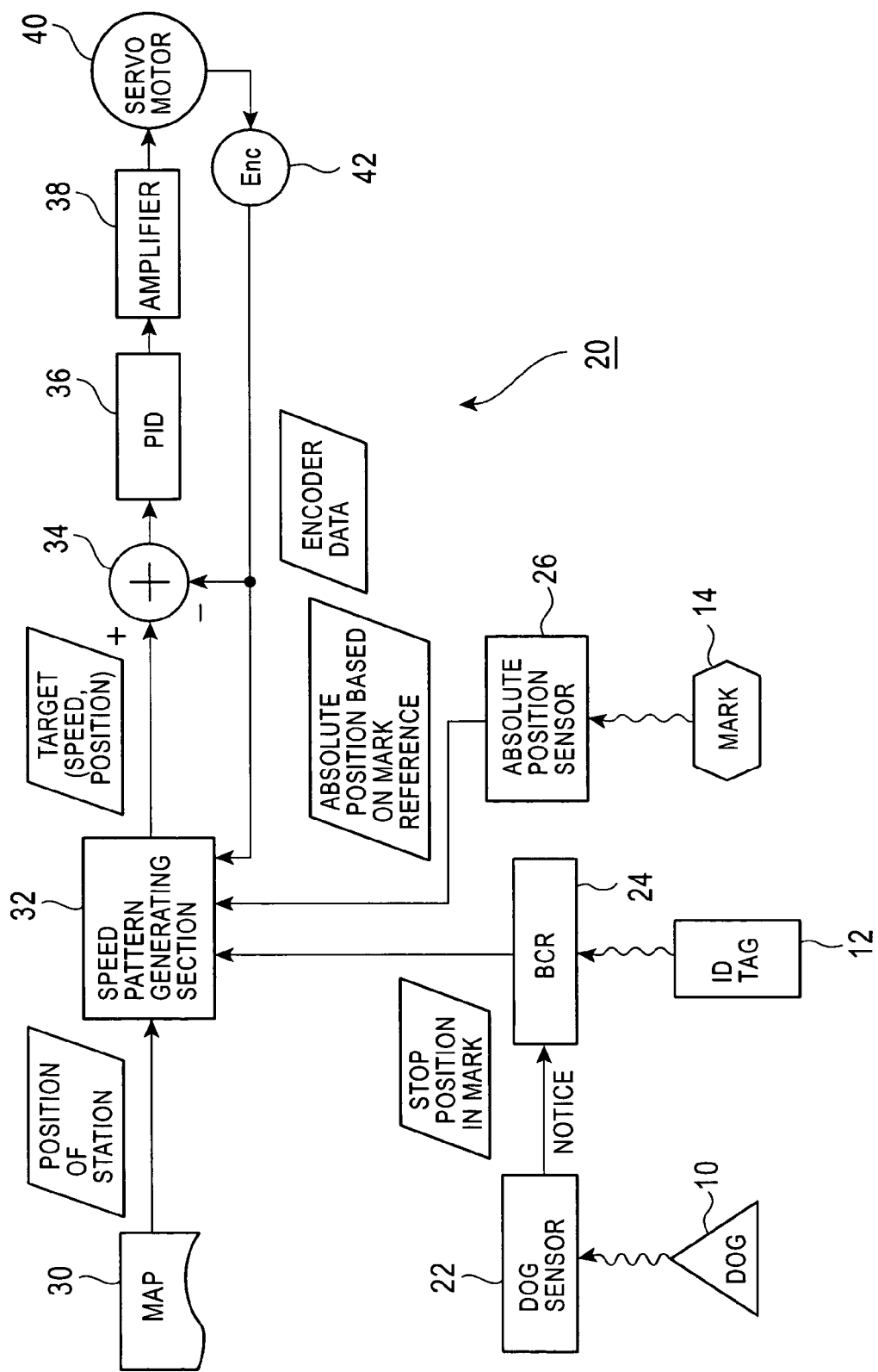
FIG. 2 is a block diagram showing a running control system in a carriage used in the embodiment.

FIG. 2 shows a running control system in the overhead running vehicle 20. The coordinates of the stop positions 8 are described in a map 30. Upon receiving a conveyance instruction, the map 30 determines the distance between the current position and the stop position. The map 30 then inputs the distance to a speed pattern generating section 32. The speed pattern generating section 32 generates a speed pattern for running to the stop position 8. 34 is an error amplifier. 36 is a PID control section that performs PID control on the basis of an error determined by the error amplifying section 34. 38 is an amplifier that amplifies an current to a servo motor 40. An encoder 42 detects the rotation speeds of a rotating shaft of the servo motor 40 and rotating shafts of running wheels. The current position and speed of the overhead running vehicle 20 determined by the encoder 42, serving as an internal sensor, are input to the speed pattern generating section 32 and error amplifying section 34. A pulse motor or the like may be used in place of the servo motor 40. The type of the encoder or the contents of control performed by the PID control section 36 are arbitrary.

For example, from a start position to detection of the mark 14 for a target stop position, the overhead running vehicle 20 performs running control on the basis of the required running distance determined from the map 30 and the current position and speed determined by the encoder 42. This running control is a kind of inferential control. In contrast, upon detecting the dog 10 in front of the stop position 8, the overhead running vehicle 20 gets ready to use the bar code reader 24 to read the data from the ID tag 12. The overhead running vehicle 20 determines the coordinates of the stop position 8 in the mark 14. The overhead running vehicle then inputs the coordinates to the speed pattern generating section 32. The absolute position sensor 26 determines the absolute position of the overhead running vehicle 20 with respect to the mark 14, in other words, determines the position using the mark 14 as a reference. The absolute position sensor 26 then inputs the position to the speed pattern generating section 32. The speed pattern generating section 32 obtains the stop position 8 based on the mark reference, from the data contained in the ID tag 12. The speed pattern generating section 32 further obtains the current position based on the mark reference, from the absolute position sensor 26. As a result, the remaining running distance is determined. Then, if the interval between signals obtained from the absolute position sensor 26 is short as in the case of the linear sensor shown in FIG. 3, the speed pattern generating section 32 also obtains its own speed from the absolute position sensor 26. If the detection interval for the absolute position is long as in the case of the optical sensor shown in FIG. 4, the speed is obtained from a signal from the encoder 42 though it is not so accurate.

Once the remaining running distance and the speed are obtained, the overhead running vehicle 20 can, for example, linearly decelerate without creep running and stop at the stop position 8, for example, to within at most 1 mm. If it is important that the overhead running vehicle 20 be smoothly stopped without vibration, then instead of linear control, sine curve control or the like may be performed on the speed immediately before the stop for vibration control. Creep running is generally carried out for at least several seconds. However, for sine curve control for vibration control, the final very slow running section lasts, for example, at most one second.

Figure 3:
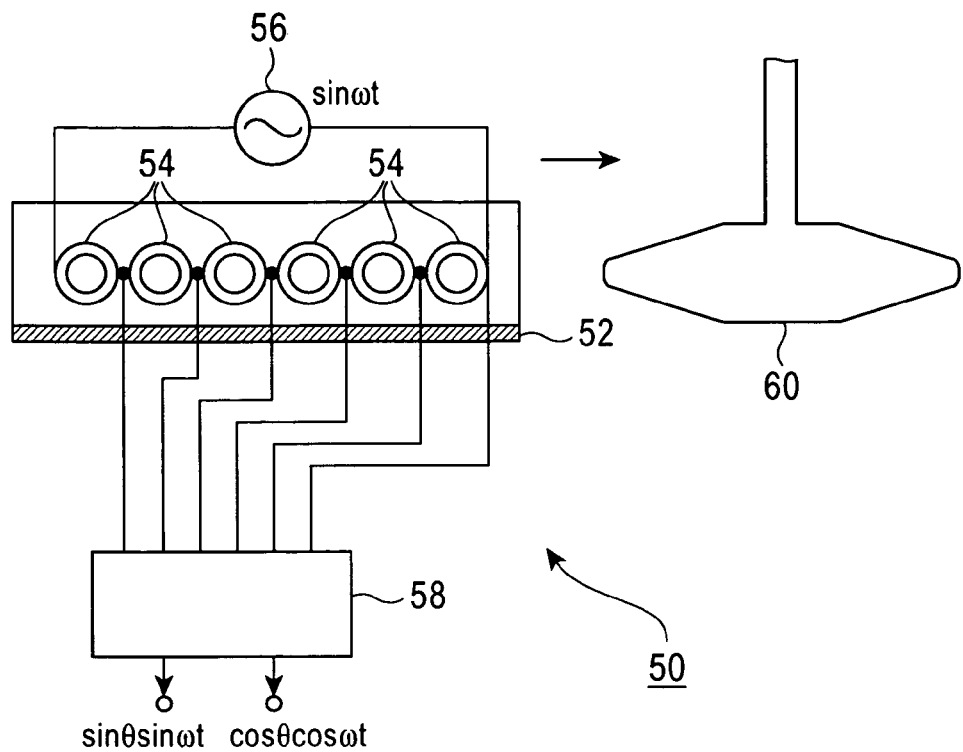
FIG. 3 is a diagram showing a linear sensor used in the embodiment.

FIG. 3 shows the configuration of a linear sensor 50 as an example of an absolute position sensor. A magnetic shield 52 is provided to prevent noise from an electricity feeding line. A plurality of detection coils 54 are arranged in the magnetic shield 52, and an AC power source 56 applies an alternate current to the detection coils 54. A signal processing section 58 processes the voltages of the detection coils 54 to obtain signals $\sin \theta$, $\sin \omega t$ or $\cos \theta$, $\cos \omega t$. Here, $\omega$ is an angular frequency from the AC power source 56. $\theta$ is the phase of the linear sensor 50 with respect to a magnetic mark 60. The position with respect to the magnetic mark 60 is determined from the $\theta$.

The magnetic mark 60 is composed of a magnetic substance such as steel or a nonmagnetic substance such as copper or aluminum. The magnetic mark 60 is fixed to the ground so as to pass through gaps provided at the opposite ends of and above the magnetic shield 52. The magnetic mark 60 has, for example, a length of about several tens of centimeters. The magnetic mark 60 is provided in front of or at the stop position so as to allow the position of the overhead running vehicle 20 to be accurately detected near the stop position 8. Moreover, to detect the position using the magnetic mark 60, it is necessary that the phase θ change slowly. Accordingly, while the overhead running vehicle 20 is running at high speed, the accuracy with which the position is detected decreases. In contrast, when the magnetic mark 60 is provided only near the stop position 8, the magnetic mark 60 can be easily and accurately detected because the overhead running vehicle 20 runs at low speed near the stop position 8.

Figure 4:
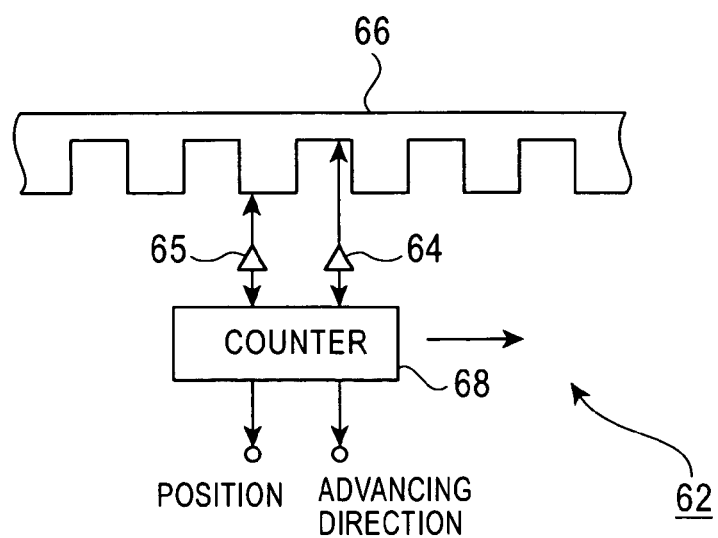
FIG. 4 is a diagram showing an example of an optical sensor for detecting an absolute position.

An optical sensor 62 in FIG. 4 uses, for example, a pair of photo interrupters 64, 65 as a photo sensor. The photo interrupters 64, 65 read, for example, an optical mark 66 with a regular edges like comb teeth or the like. Then, a counter 68 accumulates the number of edges in the optical mark 66 to determine the current position. The photo interrupters 64, 65 have a phase shifted from that of the optical mark 66 through, for example, 90 or 270 degrees. By comparing the direction of the edges detected by the photo interrupter 64 with that detected by the photo interrupter 65, it is possible to determine whether an advancing direction is rightward or leftward in FIG. 4. Further, the use of the pair of photo interrupters 64 and 65 enables the detection of the position at an accuracy corresponding to double the interval between the edges of the optical mark 66. In this case, the overhead running vehicle 20 must run at low speed in order to accurately read the optical mark 66. The position can be accurately determined using the optical mark 66 provided in front of or at the stop position 8.

Figure 5:
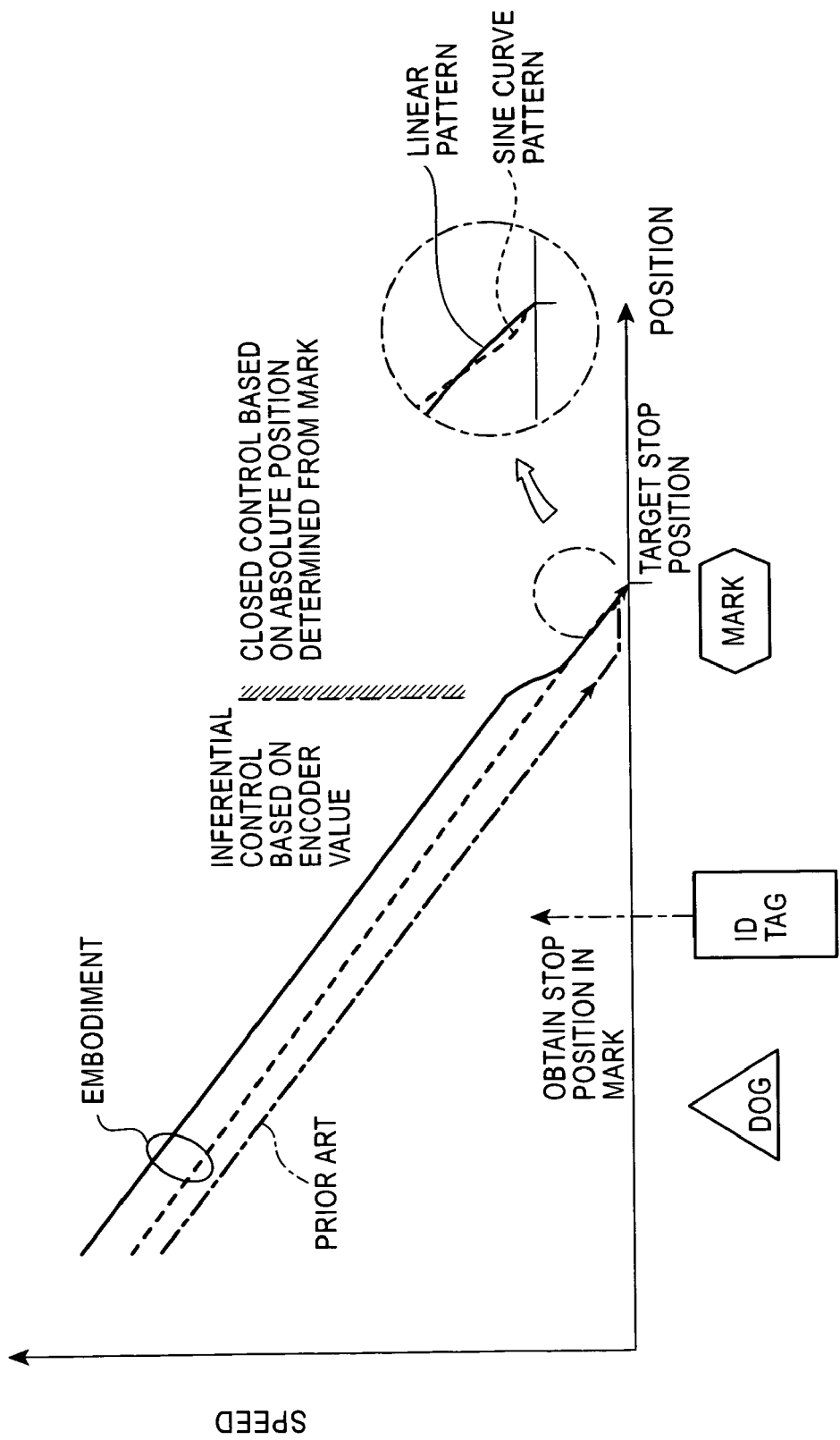
FIG. 5 is a characteristic diagram showing a stop pattern according to the embodiment.

FIG. 5 shows a speed pattern for stop control according to the embodiment. The overhead running vehicle detects the dog to get ready to read the data from the ID tag. The overhead running vehicle reads the data from the ID tag to determine the stop position based on the mark reference. Then, the overhead running vehicle runs under the inferential control of the encoder until the mark is detected. The mark has, for example, a length of about 40 cm, so that if overhead running vehicles advance to the mark from the opposite directions, the remaining running distance from the detection of the mark till stop, that is, the distance to the center of the mark, is on the order of 20 cm. If the overhead running vehicle runs in only one direction, the remaining running distance is 40 cm. Accordingly, the overhead running vehicle can advance at a higher speed. In order that the overhead running vehicle may stop after running over this remaining running distance, the running speed pattern is specified so that the overhead running vehicle starts to decelerate before detecting the mark. Since the current position and stop position based on the mark reference have already been obtained, the overhead running vehicle can decelerate in fixed decrements until it stops on the basis of these positions. The overhead running vehicle can thus stop without creep running. Sine curve control may be performed so that the deceleration decreases immediately before the stop position.

The embodiment has been shown in conjunction with the overhead running vehicle. However, the present invention is applicable to a ground running rail guided vehicle, a stacker crane, or a trackless unmanned carriage.

The embodiment produce the effects described below.

(1) The overhead running vehicle can run without creep running. Consequently, the running time required for one operation can be reduced by, for example, several seconds.

(2) If a linear sensor is used, the overhead running vehicle can be stopped at an accuracy of, for example, about 1 mm. Further, speed signals can be obtained from the linear sensor. This eliminates the need to rely on low-accuracy speed signals from the encoder.

(3) The mark may be provided in front of or at the stop position and need not be provided all over the length of the running route. Between the marks, sufficient running control can be achieved using the inferential control of the encoder.

(4) Since the mark is placed in front of or at the stop position, the overhead running vehicle can run near the mark at low speed to accurately read the mark.

(5) The ID tag indicates the coordinates of the stop position with respect to the mark. Accordingly, the accuracy with which the mark is attached need not be very high. That is, the mark may be roughly attached in front of the stop position. Then, the coordinates of the stop position with respect to the mark may be determined on the basis of, for example, data obtained from the test running of the overhead running vehicle. The coordinate may then be written in the ID tag. As a result, the mark can be easily attached. Further, if the stop position is changed, the data in the ID tag has only to be changed. The data in the map of the overhead running vehicle need not necessarily modified.

(6) The use of the optical sensor in FIG. 4 enables the advancing direction to be determined. It is also possible to double the accuracy with which to detect the position with respect to the optical mark.

The invention claimed is:

1. A carriage system comprising:

a stop position;

a detected mark; and a carriage provided with a sensor for detecting the mark and determining a position using the mark as a reference and a running control system, wherein the running control system performs speed reduction control using the stop position as a target position in accordance with the mark reference position determined in order to stop the carriage at the stop position, wherein the sensor outputs signals by a predetermined interval, wherein the carriage performs feedback control using the position detected from the mark and the position of the stop position determined using the mark as a reference, and the feedback control is a full-closed feedback control using the position detected from the mark and the position of the stop position determined using the mark as a reference;

wherein the detected mark is a single continuous magnetic mark having a first end provided in front of the stop position and a second end provided at the stop position; and wherein the sensor is a linear sensor having a plurality of detection coils which are arranged along a running direction of the carriage.

2. A carriage system according to claim 1, further comprising:

an area in which no mark is provided between the stop positions, wherein in this area, running of the carriage is controlled in accordance with a position determined by an internal sensor of the running control system.

3. A carriage system according to claim 2, further comprising:

an index provided on the ground in front of each mark, wherein the index indicates coordinates of the stop position determined using the mark as a reference, and the carriage is provided with a means for reading the index, wherein the running control system performs speed reduction control using the stop position coordinates read, as a target position.

* * * * *